June 28, 1938.  F. W. THOROLD  2,122,075
METHOD AND APPARATUS FOR GRADING ARTICLES
Filed June 14, 1935   2 Sheets-Sheet 1

INVENTOR.
Frederick Walter Thorold
by Popps and Popps
ATTORNEYS.

June 28, 1938.  F. W. THOROLD  2,122,075
METHOD AND APPARATUS FOR GRADING ARTICLES
Filed June 14, 1935  2 Sheets-Sheet 2

INVENTOR.
Frederick Walter Thorold
BY Popp and Popp
ATTORNEYS.

Patented June 28, 1938

2,122,075

UNITED STATES PATENT OFFICE 2,122,075

METHOD AND APPARATUS FOR GRADING ARTICLES

Frederick Walter Thorold, Niagara Falls, N. Y.

Application June 14, 1935, Serial No. 26,581

8 Claims. (Cl. 209—235)

This invention relates to a method and apparatus for separating a mixture of articles of different sizes into groups or grades of articles having more nearly equal size and is illustrated in the form of a size grader for peas or beans, although the invention can be employed in grading other articles.

The principal object of the invention is to provide a compact size grader in which the articles to be graded are carried immediately through or against the perforations of a separating screen, so that the articles have a minimum of abrasive contact with the screen and with one another, and in which the larger articles restrained by the screen are directly released into smooth channels so that these larger articles have a minimum of abrasive contact with the screen and with one another in being removed from the screen. To this end the separation is accomplished by placing the articles in a stream of liquid and causing the liquid to flow through perforations in a submerged screen in which a head of liquid is maintained, the liquid propelling the smaller articles directly through the screen perforations and the liquid propelling the larger articles against the screen so as to close a corresponding number of openings. By grading the articles in this manner all of the articles immediately find free openings and the articles do not bump and roll along the screen surface so that the articles are not crushed and scuffed during the grading operation.

Other important objects of my invention are to provide such a size grader in which the grading is accomplished rapidly and positively without bruising or breaking the articles; in which the operation is continuous and can be automatic; in which a minimum of skill and attendance is required and in which a small space is required for the apparatus and in which the cost of maintenance and operation is low.

Another object of the present invention is to provide such a grader in which a cylindrical screen is employed, the lower portion being submerged and the screen being rotated and the entrained articles discharged directly from the perforations in which they are caught into helical ways through which the articles are conveyed to the point of discharge. By this means the larger articles, after being released from the perforations in which they are caught, do not have further contact with the screen and are not crushed or abraded in being discharged from the grader.

Another object of the present invention is to provide such a grader in which the velocity of the liquid passing through all of the perforations of the submerged portion of the screen is positive throughout the full length of the screen. To this end the liquid is admitted to the screen in two streams, one bearing the peas and the other being admitted through a cylinder having openings which are so disposed as to insure positive velocities through all perforations in the submerged portion of the screen.

There are in use two types of apparatus for grading peas, each using revolving cylindrical screens placed on a slight angle, the peas being fed into the higher end and those peas larger than the screen perforations being discharged from the lower end. In one of these types the peas retained on the screen are run through other screens, while in the other type those peas passing through the perforations are run through the other screens. In the former type, the screens are placed end to end, while in the latter the screens are placed one under the other. In some of these graders water is sprayed on or into the screen but in all cases the entire screen is exposed to the atmosphere, no part being submerged in water and no head of water being built up in the screen by a stream of water carrying the peas so as to propel the peas directly toward the free openings in accordance with my invention.

In a well known pea grader the grader consists of four cylindrical screens each 5 feet in diameter and 20 feet long, making a total length of 80 feet. With such a grader it is apparent that one size of pea must roll or bump along the full 80 feet of screen. In addition, as the screen revolves the peas are carried up the screen until the slope becomes such that the peas roll back to the bottom, the distance of this rolling being approximately 29 inches. I have further found that each time a pea is carried up the screen and rolls back the 29 inches to the bottom of the screen it moves 1½ inches toward the outlet of the screen. It is therefore apparent that that grade of peas that traverses the full length of the grader rolls or bumps along the screen a distance of 1500 feet, and the other grades of peas while rolling and bumping a shorter distance along the screen surface nevertheless traverse a great distance of screen surface. In actual practice the condition is not quite so bad as indicated above because there is some depth to the volume of peas rolling through the screens and naturally only those peas on the bottom can touch the screens. However, whether the peas bump over the perforations on the screen or merely bump along with other peas every pea is subject to violent erosion and crushing action throughout its travel in the screen and if the pea is tender or if the skin of the pea is slightly injured in the viner or cleaner, previous to grading, this travel through the grader under consideration is sufficient to open up the wound and produce two splits and a skin. Such splits and skins are found in quantities around a grader of the type under consideration.

Figure 4:
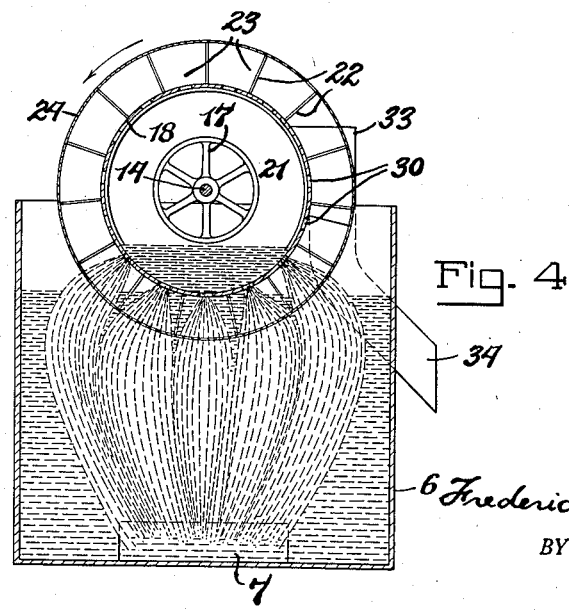
Fig. 4 is a fragmentary vertical transverse section, taken on line 4—4, Fig. 1.

The water employed in connection with my invention is contained in a storage tank 1 and is recirculated through the grader by a centrifugal pump 2 which draws water through a suction pipe 3 from the tank 1 and discharges it through an outlet pipe 4. It will be understood that the usual devices for maintaining a constant amount of water in the storage tank 1 can be employed and also that the usual devices can be employed for admitting fresh water to this tank and providing for an overflow so that the water is kept clean. The pipe 4 from the outlet of the water circulating pump discharges into one end of a channel 5, the other end of which projects into a tank 6 and fills this tank to the level indicated in Fig. 4. As the water rises in the tank 6 it passes through an opening 7 in the bottom of the tank into a vertical channel 8 and over an overflow weir or lip 9. The level of the water in the tank 6 can be determined by the height of this overflow lip or weir 9 or can be determined by proportioning the size of the opening 7 or channel 8 and the velocity of the discharge of the pump 2. The water overflowing from the weir 9 falls on a screen 10 from which it falls back into the tank 1 and is recirculated.

Peas to be graded are placed in a hopper 13 from which they are discharged into the stream of water passing through the channel 5. In the absence of the cylindrical screen hereinafter described and with a sufficient volume of water to provide a cleansing velocity through the system it is apparent that all of the peas placed in the hopper 13 will be carried by the water through the tank 6, opening 7, vertical channel 8 and will fall onto the screen 10. The bars on the screen 10 are closely spaced so as to prevent the peas falling between them and therefore peas deposited on the bars 10 are discharged from the end of the screen, the water returning to the tank.

Figure 1:
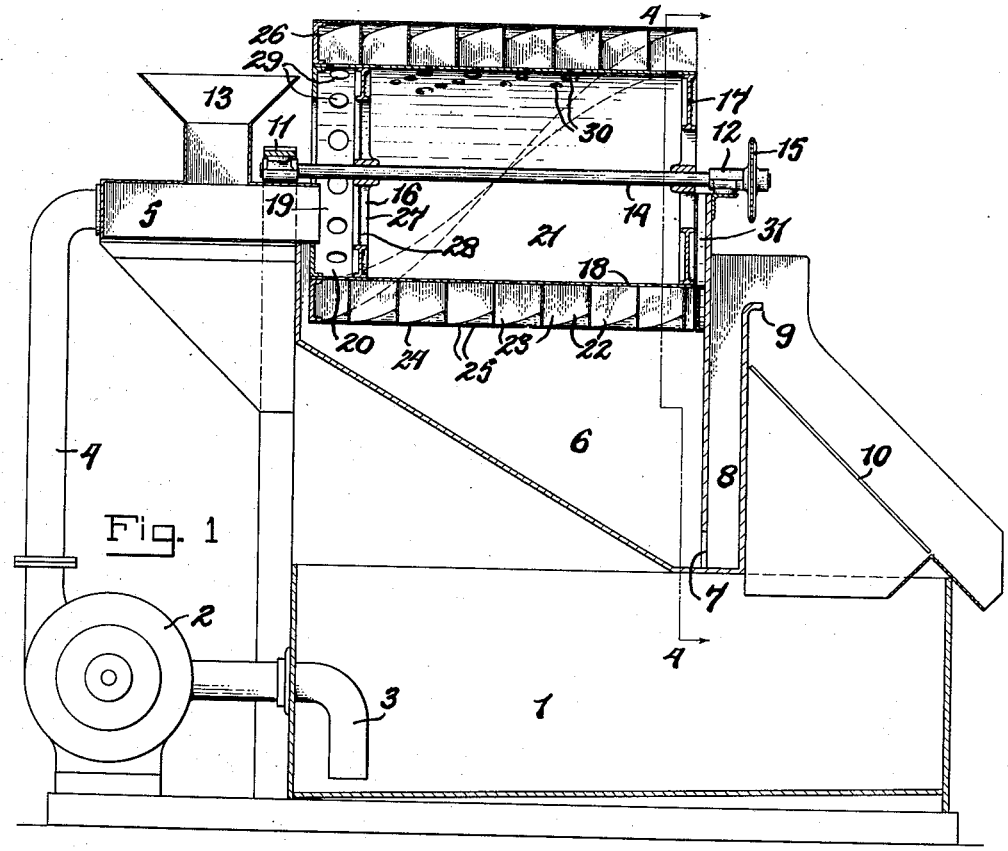
Fig. 1 is a vertical section through a size grader embodying my invention, taken on line 1—1, Fig. 2.
Figure 2:
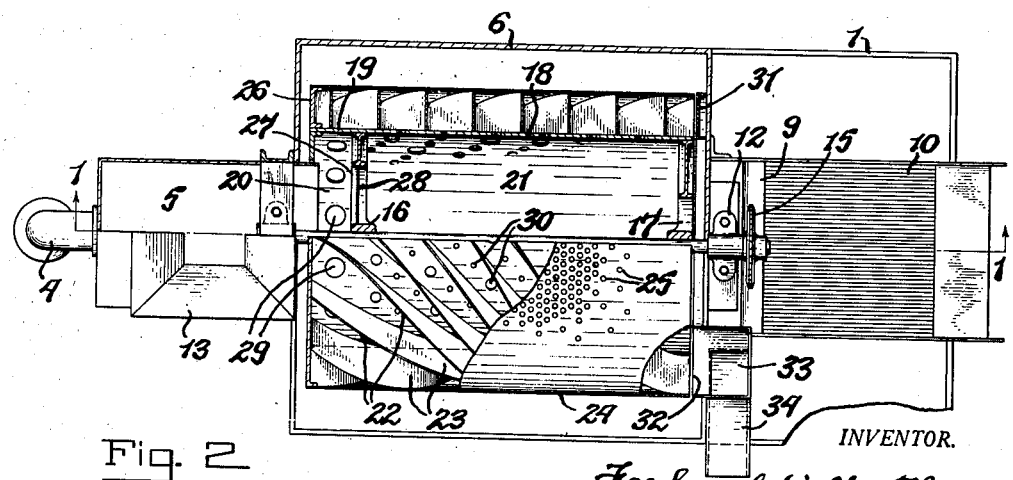
Fig. 2 is a top plan view thereof, partly in section.
Figure 3:
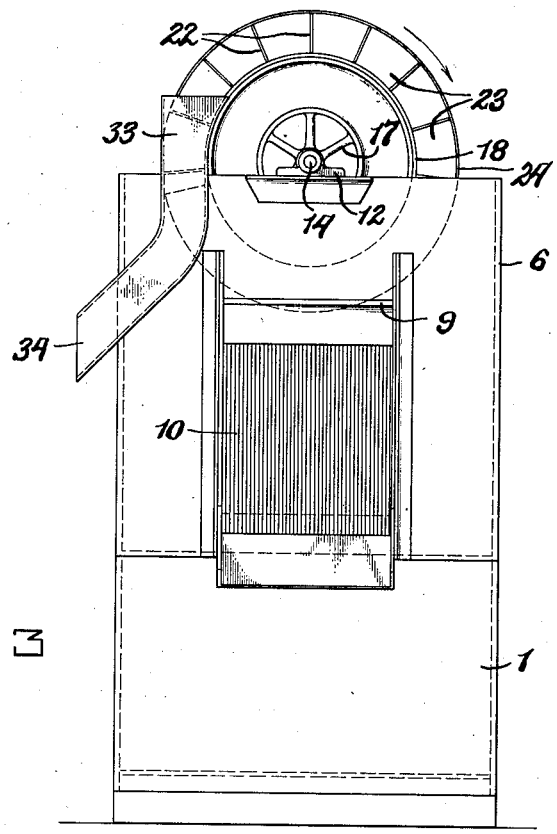
Fig. 3 is a vertical elevation of the discharge end of the grader.

The cylindrical screen is supported on a horizontal steel shaft 14 journaled in split bearings 11 and 12 which are preferably of such form that the shaft and the cylindrical screen carried thereby can be readily removed from the tank 6 and replaced. This shaft is rotated in the direction indicated by the arrows in Figs. 3 and 4 by means of a sprocket 15 or in any other suitable manner. Two spiders 16 and 17 are fast to the shaft 14 and support a cylinder 18, this cylinder 18 projecting beyond the spider 16 so as to provide an extension 19 forming a compartment 20 into which the discharge end of the channel 5 projects, as best indicated in Fig. 1, the interior of the cylinder 18 on the opposite side of the spider 16 forming a compartment 21. The cylinder 18 shown is approximately 30 inches in length and in the graders shown fifteen strips of metal 22 are attached on edge to the outside of the cylinder and are formed to provide a corresponding number of helical channels indicated at 23. The pitch of the strips 22 is preferably steep so that the peas falling on these strips are carried to the end of the cylinder as the cylinder is rotated.

A zinc sheet 24 is wrapped around the outside of the strips 22 so as to form an outside cylinder, the ends of the sheet being preferably lapped so as to provide a complete cylinder. This zinc sheet 24 is provided with uniformly spaced perforations 25 so as to form a grading screen. The size of the perforations 25 is determined, of course, by the size of the peas which are to be retained on the screen. At the inlet end of the rotary screen assembly a ring or annular head 26 is provided which connects the ends of the cylinders 18 and 24 so as to close the space therebetween, this space at the opposite end of the assembly being left open to permit the discharge of peas from the helical strips 22. The spider 16 is provided with a central opening 27 in which an annular screen 28 is mounted, the mesh of this screen 28 being sufficiently small so that no peas will pass the spider 16. The portion 19 of the inner cylinder 18 extended beyond the spider 16 is provided with a number of large openings 29, these openings being arranged in a row around the extension and each of these openings leading into a corresponding channel 23. On the other side of the spider 16 the cylinder 18 is provided with a large number of openings 30, these openings 30 being of such size and distribution as to insure a uniform delivery of water from the interior of the cylinder 18 to the full length of the screen 24.

At the discharge end of the channels 23 a semicircular abutment 31 is mounted on the inside face of the end wall of the tank 6, this abutment 31 being concentric with the shaft 14 and blocking the discharge ends of the channels 23 as these ends travel below the horizontal plane of the axis of the assembly. At one end the abutment 31 extends up to the lip 32 of a hopper 33, this hopper discharging into a chute 34.

In the grader shown the water is supplied by the pump 2 at from 300 to 500 gallons per minute so as to provide a self-cleansing velocity. Such a velocity carries the peas past all obstructions so that there is no danger of the peas lodging in any part of the apparatus. With the pump in operation and peas being fed through the hopper 13 and the screen assembly rotated in the direction indicated by the arrows on Figs. 3 and 4 the water discharging from the channel 5 will pour into the compartments 20 and 21 of the interior cylinder 18 and fill each of these compartments up to a level determined and fixed by the total free area formed by the openings 29 and 30 in the cylinder 18 below this level.

The peas in this stream of water discharged from the channel 5 will be carried into the compartment 20, but due to the screen 28 none of these peas enter the compartment 21, the screen 28 thereby dividing the stream of water discharged from the channel 5 into two parts, one of which carries the peas and the other of which does not. That part of the water carrying the peas is carried through the openings 29 into those helical channels 23 the inlet ends of which are disposed below the level of the water in the compartments 20 and 21. The balance of the water flowing into the compartment 21 flows out through the openings 30 into the portions of the helical channels 23 which are arranged below the level of the water in the compartment 21, the openings 30 being distributed so as to insure, in conjunction with the openings 29, a positive velocity through the openings 30 in the entire length of the submerged portion of the separating screen 24. As the stream of water carrying the peas enters the channels 23 the peas race toward the nearest free openings in the screen 24. Those peas which are smaller than these openings 25 of the screen 24 are positively propelled through these openings and pass with the water into the bottom of the tank 6. Those peas which are larger than the openings rush to the nearest free openings and, of course, block these openings since they cannot pass. The following peas are then required to race to other free openings but it will be observed that in doing so the peas do not bump along the screen surface nor do they bump the peas already entrained since each pea is carried by the water directly to a free opening because the free openings are the only ones through which the water and smaller sized peas can escape. It will therefore be seen that the grading proceeds at a high rate of speed with a minimum of travel by the peas and with a minimum of abrasion by the screen surface or by other peas. As the screen rotates the clean area of the screen is constantly being submerged and the area loaded with the larger peas constantly being elevated above the level of the water. As the portion of the screen containing the entrained peas rises the entrained peas fall back out of the openings 25 into the channels 23 and since these channels are formed by the helical strips 22 which have a comparatively steep pitch the peas immediately roll down these strips and against the abutment 31. As the discharge end of each of the helical channels 23 passes above the lip 32 the peas roll over the lip 32 into the hopper 33 and out through the chute 34.

In the grader described only two grades or sizes of peas are obtained. Obviously any number of grades can be obtained, however, by multiplying the number of units and by adjusting the size of the perforations in the screens of the several units. Thus, if the water and smaller sized peas discharged from the weir 9 are discharged into the inlet 5 of another unit having the screen provided with smaller perforations a third grade will be obtained and similarly any additional number of grades can be obtained. With such a multiple unit it is obvious that the screens can be arranged either end to end or one above the other, the latter providing a very compact grader. It will also be understood that usual and well known devices can be used for pressing the peas out of the perforations if caught therein, such as to provide a soft rubber roll engaging the outside of the screen.

From the foregoing it is apparent that the present invention provides a method and apparatus for grading articles as to size in which the articles are not broken or bruised during the screening operation inasmuch as the stream of water which carries them causes them to race immediately to the nearest free openings of the screen instead of bumping along the screen as has been the case heretofore. In order to effect this it will be appreciated that the peas must be carried in a large volume of water at a sufficient velocity to carry the peas through the entire apparatus and it will also be appreciated that a head of water must be maintained within the screen itself, either by submerging the screen or by supplying the water at sufficient quantities and at a sufficient velocity to maintain a head within the screen. The present invention also provides a method and apparatus for grading articles in which the articles are quickly and positively separated into grades without being bruised or broken; in which the operation can be automatic and continuous; in which a minimum of skill and attendance is required and in which the apparatus occupies a very small space. Further, the power requirements for the grader are small and the maintenance costs low.

I claim as my invention:

1. As a continuous process, the method of grading food particles such as peas for size which comprises mixing a continuous stream of peas with a stream of running water, causing said stream of water and peas to flow continuously against a screen at a velocity to compel all of the articles to be graded to reach the screen and in such volume that a substantial head of the water is maintained against the screen and the peas smaller than the screen perforations propelled through the perforations by the water together with all of the water and the peas larger than the screen perforations propelled against said screen by the water so as to cover some of the perforations therein and continuously removing that portion of said screen on which the said larger peas are retained from the water and removing the said larger peas therefrom.

2. The method of grading food particles such as peas for size which comprises placing the peas in a stream of running water and causing the stream to flow through a screen partially submerged and completely blocking said stream whereby all of the water and all peas smaller than the screen perforations are propelled through the perforations by the stream of water and all peas larger than the screen perforations are propelled to some of the perforations and retained on the screen by the pressure of the water, moving said screen to continuously elevate the portion on which peas are entrained out of said stream and removing the entrained peas from said elevated portion.

3. The method of grading articles for size which comprises placing the articles in a stream of running liquid, removing the articles from one part of said stream, causing the other part of said stream to flow against one end of a screen, distributing the first part of said liquid along said screen to maintain a uniform substantial head of liquid against said screen whereby all of the articles smaller than the perforations of said screen are propelled therethrough by the liquid and all the articles larger than the perforations of said screen are propelled against said screen by the liquid so as to cover some of the perforations therein and removing the said larger articles from said screen surface.

4. A size grader for articles, comprising a substantially horizontal rotary cylindrical screen, means for propelling an entire stream of liquid into said screen and through the perforations thereof and maintaining a head of liquid of substantial depth in the bottom of said screen, means for placing said articles in said stream prior to passing through said screen, the perforations of said screen permitting the smaller articles to be propelled therethrough by said stream and the larger articles being propelled against said screen by said stream and covering some of the perforations therein, means for rotating said screen so as to move successive portions into and out of said stream, and a plurality of strips along the inside of said screen and forming helical ways into which the entrained articles drop on rising from said stream and along which said entrained articles are conducted to one end of the screen.

5. A size grader for articles, comprising a substantially horizontal drum, a coaxial cylindrical screen surrounding said drum, means for propelling a stream of liquid into said screen and drum and maintaining a head of liquid of substantial depth in the bottoms thereof, means compelling all of said liquid to pass through the perforations of said screen, means for placing said articles in the stream of liquid admitted to said screen, the perforations of said screen permitting the smaller articles to be propelled therethrough by said stream and the larger articles being propelled against said screen by said stream and covering some of the perforations therein, said drum being provided with openings distributing the liquid admitted to said drum along the length of said screen to insure a positive flow of liquid through the entire length of said screen, means for rotating said screen so as to move successive portions thereof into and out of said stream and means for removing the entrained articles from the interior of said screen.

6. A size grader for articles, comprising a substantially horizontal rotary drum, a coaxial cylindrical screen surrounding and rotating with said drum, a transverse screen across the interior of said drum and forming an inlet compartment and a secondary compartment therein, a plurality of large openings in said drum around said inlet compartment, means for propelling a stream of liquid into said inlet compartment, means for placing the articles to be graded into said stream, all of said articles and a portion of said liquid passing through said openings into said cylindrical screen and the balance of said liquid passing through said transverse screen into said secondary compartment and being distributed therefrom along said cylindrical screen through openings provided in said drum around said secondary compartment, said cylindrical screen being partially submerged in said stream whereby the smaller of said articles are propelled through the perforations of said cylindrical screen by said liquid and the larger articles are propelled against said cylindrical screen by said liquid and cover some of the perforations therein, means for rotating said drum and cylindrical screen so as to move successive portions thereof into and out of said stream and means for removing the entrained articles from the interior of said cylindrical screen.

7. A size grader for articles, comprising a substantially horizontal drum, a coaxial cylindrical screen surrounding said drum, means for propelling a stream of liquid into said screen and drum and maintaining a head of liquid of substantial depth in the bottoms thereof, means compelling all of said liquid to pass through the perforations of said screen, means for placing said articles in the stream of liquid admitted to said screen, the perforations of said screen permitting the smaller articles to be propelled therethrough by said stream and the larger articles being propelled against said screen by said stream and covering some of the perforations therein, said drum being provided with openings distributing the liquid admitted to said drum along the length of said screen to insure a positive flow of liquid through the entire length of said screen, means for rotating said screen so as to move successive portions thereof into and out of said stream and a plurality of fins between said drum and screen and forming helical ways into which the entrained articles drop on rising from said stream and along which said entrained articles are conducted to one end of the screen.

8. A size grader for articles, comprising a substantially horizontal rotary drum, a coaxial cylindrical screen surrounding and rotating with said drum, a plurality of strips in the space between said drum and screen and forming helical ways, a transverse screen across the interior of said drum and forming an inlet compartment and a secondary compartment therein, a plurality of large openings in said drum around said inlet compartment and leading therefrom into the ends of said helical ways, means for propelling a stream of liquid into said inlet compartment, means for placing the articles to be graded into said stream, all of said articles and a portion of said liquid passing through said openings into said ways and the balance of said liquid passing through said transverse screen into said secondary compartment and being distributed therefrom along said cylindrical screen through openings in said drum around said secondary compartment, said cylindrical screen being partially submerged in said stream whereby the smaller of said articles are propelled through the perforations of said cylindrical screen by said liquid and the larger articles are propelled against said cylindrical screen by said liquid and cover some of the perforations therein and means for rotating said drum and cylindrical screen so as to move successive portions thereof into and out of said stream, the articles entrained on said cylindrical screen dropping into said helical ways on rising from said stream and being conducted to the end of said screen opposite said inlet compartment.

FREDERICK WALTER THOROLD.